A. J. MATTER.
PROTRACTOR LEVEL.
APPLICATION FILED JUNE 10, 1908.
933,912.
Patented Sept. 14, 1909.
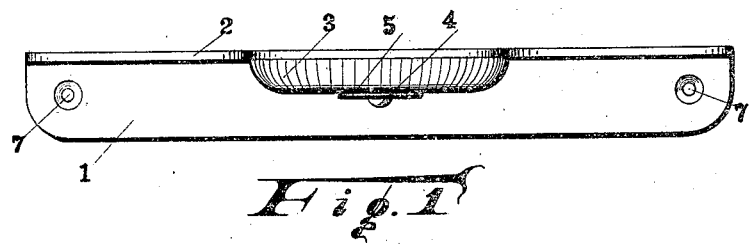
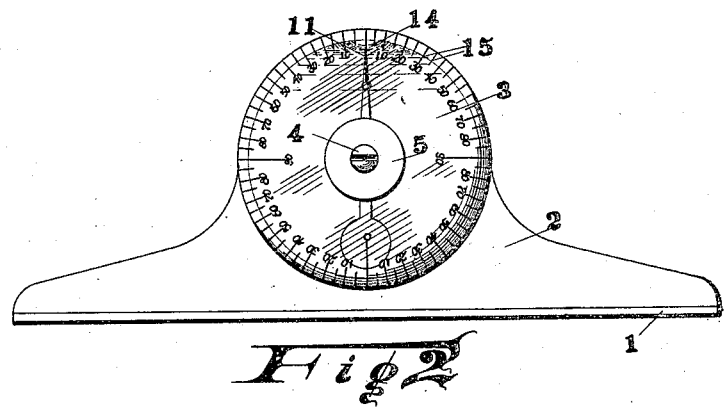
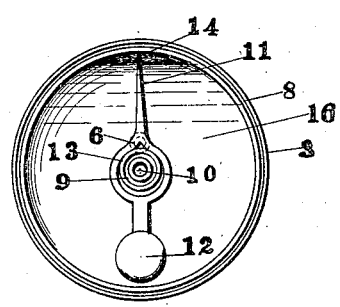
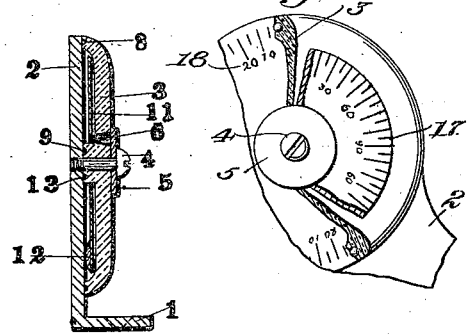
WITNESSES:
F. O. Matter.
F. A. Vordorfer
INVENTOR
Albert J. Matter

UNITED STATES PATENT OFFICE.

ALBERT J. MATTER, OF PORTLAND, OREGON.

PROTRACTOR-LEVEL.

933,912.

Specification of Letters Patent.  Patented Sept. 14, 1909.

Application filed June 10, 1908. Serial No. 437,661.

*To all whom it may concern:*

Be it known that I, ALBERT J. MATTER, a citizen of the United States, residing at Portland, in the county of Multnomah and State of Oregon, have invented certain new and useful Improvements in Protractor-Levels, of which the following is a specification.

This invention relates to improvements in levels and has for its object to provide a cheap and simple level for the purpose of discerning the angle of any surface as compared with a horizontal surface. I attain this object by means of the improvements illustrated in the accompanying drawings in which—

Figure 1 is a top view. Fig. 2 is a front elevation. Fig. 3 shows a back view of the glass case 3 with the back plate 2 removed. Fig. 4 is a sectional elevation through the center of the level. Fig. 5 shows details of different methods of placing the figures and degree marks upon the level.

Like numerals of reference indicate similar parts in the several views.

Referring to the drawings, a concave glass case 3 is fastened to a back plate 2 or any other suitable support by means of a screw 4 and cemented to said back plate or other suitable support by means of cement in grooves 8 and 9. Degree marks and figures 15 stating the various angles, are molded in the glass case 3 as shown in Fig. 2, or may be printed on a circular sheet of paper as shown at 17 Fig. 5, or stamped on a circular piece of metal as shown at 17 Fig. 5 attached to the front of glass case 3 or stamped on the metal back 2 as shown at 18 in Fig. 5, in such manner as to indicate the various angles. The inner hollow portion of glass case 3 is filled with a liquid 16 through aperture 6. A cork or plug of any suitable material is placed in aperture 6, when full, to keep said liquid within the glass case 3. A washer 5 covers aperture 6 and is held in place by screw 4. When filling the level, a small bubble 14 is allowed to form. This bubble always remaining on top of the liquid, will, in conjunction with the degree marks and figures 15, indicate the angle at which foot 1 of back 2 stands as compared with a horizontal surface.

If desirable, the level may be attached to a rod or other object by means of screws through holes 7.

For the purpose of more accurately reading the correct angle, an indicating pointer 11 is pivotally mounted in center of level on center post 13 and is kept pointing upward by means of weighted portion 12. The liquid surrounding pointer 11 tends to keep the weighted portion 12 from swinging back and forth, thus bringing the pointer 11 to the proper position more quickly than it would without the use of water or other liquid.

It is understood that slight changes may be made in the specific structure shown without departing from the spirit of the invention.

What is claimed is;

1. In a protractor level, the combination with a flat back or support, of a concave glass case provided with a center post in its center, and having grooves in contact surfaces of outer edge and center post for the reception of the cement, and having an orifice through the center of the aforementioned center post, and having an orifice in the front side of said glass case for the purpose of filling said glass case with liquid, and having degree marks and figures molded in the surface of said glass case for the purpose of reading the angle in conjunction with the bubble, a screw extending through said first named orifice and into said back or support, a washer beneath head of said screw, and means for closing said last named orifice, all substantially as set forth.

2. In a protractor level as described, the combination with a glass case provided with a center post as described of a weighted pointer pivotally mounted on the center post of the glass case, all substantially as set forth.

In testimony whereof I affix my signature, in presence of two witnesses.

ALBERT J. MATTER.

Witnesses:
  THOS. M. GOODRICH,
  E. S. TAYLOR.